United States Patent
van Hassel et al.

(10) Patent No.: US 10,480,093 B2
(45) Date of Patent: Nov. 19, 2019

(54) SEALING PROCESS FOR AN ANODIZED ALUMINUM-ALLOY SURFACE

(71) Applicant: United Technologies Corporation, Farmington, CT (US)

(72) Inventors: Bart Antonie van Hassel, Weatogue, CT (US); Georgios S. Zafiris, Glastonbury, CT (US); Zhongfen Ding, South Windsor, CT (US); Michael A. Kryzman, West Hartford, CT (US); Mark R. Jaworowski, Glastonbury, CT (US); Weina Li, South Glastonbury, CT (US); Blair A. Smith, South Windsor, CT (US); Weilong Zhang, Glastonbury, CT (US); Promila Bhaatia, Farmington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 29 days.

(21) Appl. No.: 15/593,873

(22) Filed: May 12, 2017

(65) Prior Publication Data
US 2018/0327926 A1   Nov. 15, 2018

(51) Int. Cl.
*C25D 11/24* (2006.01)
*C23C 22/83* (2006.01)
*C23C 22/73* (2006.01)
*C23C 28/04* (2006.01)

(52) U.S. Cl.
CPC ............ *C25D 11/246* (2013.01); *C23C 22/73* (2013.01); *C23C 22/83* (2013.01); *C23C 28/048* (2013.01); *C23C 2222/10* (2013.01)

(58) Field of Classification Search
CPC ....... C25D 11/246; C23C 22/73; C23C 22/83; C23C 28/048; C23C 2222/10
See application file for complete search history.

(56) References Cited

U.S. PATENT DOCUMENTS

| 5,935,656 A | 8/1999 | Koerner et al. |
| 6,379,523 B1 * | 4/2002 | Takabayashi ......... C25D 11/08 205/173 |
| 7,422,793 B2 * | 9/2008 | Phelps .................... C23C 22/83 106/14.05 |

(Continued)

FOREIGN PATENT DOCUMENTS

| CN | 103498179 A | 1/2014 |
| EP | 2977491 A1 | 1/2016 |

OTHER PUBLICATIONS

Rivas-Vazquex et al (Journal of the European Ceramic Society, vol. 26, pp. 81-88, 2006 (Year: 2006).*

(Continued)

*Primary Examiner* — Louis J Rufo
(74) *Attorney, Agent, or Firm* — Cantor Colburn LLP

(57) ABSTRACT

A sealing process includes applying a first reactant to a substrate having a porous structure, the first reactant comprising a chromium (III) precursor and a transition metal precursor and applying a second reactant to the first reactant, the second reactant comprising a rare earth element precursor and an alkaline earth element precursor to form reservoirs of trivalent chromium in pore space of the porous structure, and a physical barrier over the substrate and the reservoirs.

16 Claims, 2 Drawing Sheets

(56) References Cited

U.S. PATENT DOCUMENTS

| | | | |
|---|---|---|---|
| 9,879,347 B2 | 1/2018 | Bares et al. | |
| 2007/0245897 A1 | 10/2007 | Besecker et al. | |
| 2015/0020925 A1* | 1/2015 | Bares | C25D 11/18 148/267 |

OTHER PUBLICATIONS

Extended European Search Report for EP Application No. 18171703.4; Report dated Oct. 15, 2018 (16 pages).

Anokhin et al.; "Influence of Additives of Aluminum, Magnesium and Calcium on Synthesis and Sintering of Lanthanum Chromite"; Inorganic Materials: Applied Research; vol. 5, No. 4; 2014, pp. 323-329.

Kang et al.; "Syntheses of Doped-LaCrO3 Nanopowders by Hydrothermal Method"; Open Journal of Inorganic Non-Metallic Materials; 3; 2013, pp. 37-42.

Modeshia et al.; "Solvothermal synthesis of perovskites and pyrochlores: crystallisation of functional oxides under mild conditions"; Chem. Soc. Rev.; 39; 2010, pp. 4303-4325.

Nyman et al.; "Substitutional doping and oxygen vacancies in La2Zr2O7 pyrochlore oxide"; Solid State Ionics; 189; 2011, pp. 19-28.

Rendón-Angeles;"Crystallization of LaCrO3 powders and its solid solutions doped w/ Sr2+ & Al3+ under hydrothermal conditions";14th Int. Conf.onProp. of Water&Steam in Kyoto,www.iapws.jp/Proceedings/Symposium05/303Rendon-Angeles.pdf;acc. Apr. 26, 2017;303-308.

Rivas-Vazquez et al.; "Preparation of calcium doped LaCrO3 fine powders by hydrothermal method and its sintering"; Journal of the European Ceramic Society; 26; 2006, pp. 81-88.

\* cited by examiner

SEALING PROCESS FOR AN ANODIZED ALUMINUM-ALLOY SURFACE

BACKGROUND

The present disclosure relates to a sealing process and, more particularly, to a sealing process of an anodized layer.

Aluminum oxide layers that grow from aluminum alloys during anodizing have a porous structure through which the base metal remains exposed to corrosive environments. A corrosion barrier of hexavalent chromium is utilized to protect the metal under these porous structures. Hexavalent chromium compounds are substances that may be of concern under the European REACH regulation.

SUMMARY

Disclosed herein is a sealing process, comprising applying a first reactant to a substrate having a porous structure, the first reactant comprising at least one of a trivalent chromium precursor and a transition metal precursor; and applying a second reactant to the first reactant, the second reactant comprising a rare earth element precursor and an alkaline earth element precursor to form reservoirs of trivalent chromium in the porous structure, and a physical barrier over the substrate and the reservoirs.

In an embodiment, the substrate is an anodized aluminum-alloy surface with a barrier oxide film.

In another embodiment, the trivalent chromium precursor includes at least one of a chromium (III) nitrate, and a chromium (III) sulfate.

In yet another embodiment, the transition metal precursor includes precursor of at least one of zirconium and titanium.

In yet another embodiment, the rare earth element precursor includes at least one of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y) and the alkaline earth element precursor includes at least one of magnesium (Mg), calcium (Ca), strontium (Sr), and barium (Ba).

In yet another embodiment, the physical barrier is formed at a surface of the porous structure on the anodized aluminum alloy substrate.

In yet another embodiment, the physical barrier is formed within the pore space of the porous structure on the anodized aluminum alloy substrate.

In yet another embodiment, the reaction products include a compound with the composition $RECrO_3$, where RE is a trivalent rare earth cation such as lanthanum, cerium, praseodymium, neodymium, promethium, samarium, europium, gadolinium, terbium, dysprosium, holmium, erbium, thulium, ytterbium, or lutetium, or its $Ca^{2+}$, $Sr^{2+}$ and $Al^{3+}$ doped forms.

In yet another embodiment, the physical barrier comprises a doped perovskite or pyrochlore crystalline structure.

In yet another embodiment, the physical barrier comprises a crystalline structure with the chromium, the transition metal element, the rare earth element, and the alkaline earth element.

In yet another embodiment, the physical barrier comprises a crystalline structure with the chromium, the transition metal element, the rare earth element, and the alkaline earth element and is further crystallized into a perovskite structure.

In yet another embodiment, the reactants react to form a compound with the composition $La_2Zr_2O_7$ that crystallizes into a pyrochlore crystal structure.

In yet another embodiment, the compound contains $Al^{3+}$ by interacting with a hydrated form of aluminum oxide on pore walls of the porous structure.

In yet another embodiment, the first reactant comprises a dopant.

In yet another embodiment, the dopant includes $Ca^{2+}$ and $Se^{2+}$ precursors.

In yet another embodiment, the reaction product includes $RECrO_3$, where RE is a trivalent rare earth cation that includes at least one of lanthanum, cerium, praseodymium, neodymium, promethium, samarium, europium, gadolinium, terbium, dysprosium, holmium, erbium, thulium, ytterbium, or lutetium, or its $Ca^{2+}$, $Se^{2+}$ and $Al^{3+}$ doped forms.

Disclosed herein too is a substrate, comprising an anodized layer having a porous structure filled with a trivalent chromium corrosion inhibitor and a physical barrier over the anodized layer that seals the trivalent chromium corrosion inhibitor within the porous structure.

In yet another embodiment, the physical barrier seals the porous structure and forms reservoirs in the porous structure filled with corrosion inhibitors.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
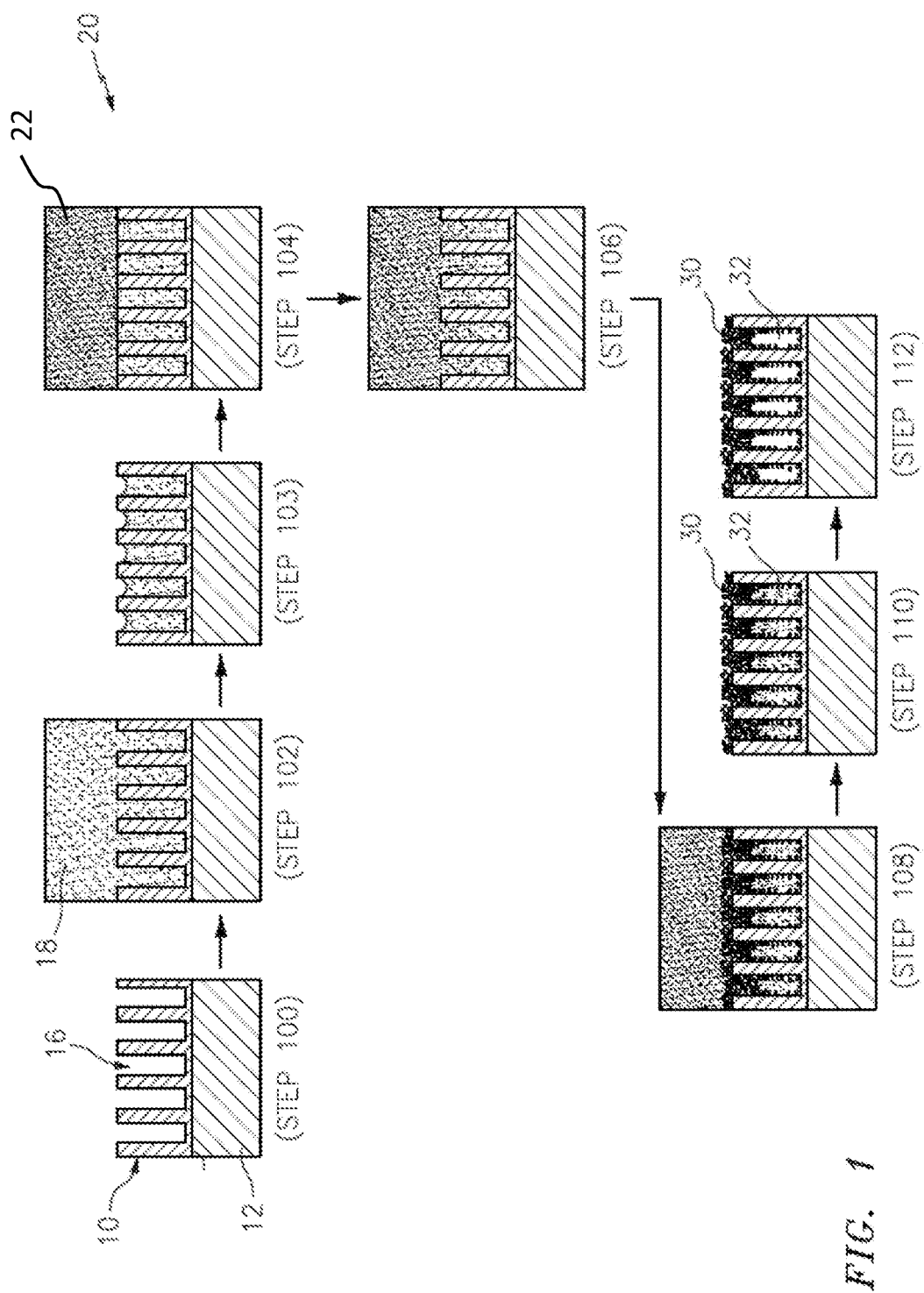
FIG. 1 is a block diagram that illustrates a sealing process of an anodized layer according to one disclosed non-limiting embodiment.

FIG. 1 schematically illustrates a sealing process 20 for sealing an aluminum oxide layer 10 on an aluminum alloy 12 (step 100) to protect the aluminum alloy 12 from corrosion. The aluminum oxide layer 10 includes a porous structure 16 of many small pores in the range of about 5 to 30 nanometers, preferably 8 to 25 nanometers in diameter with a relatively high porosity of about, for example, from 10% to 90 volume percent (vol %), preferably 20 to 80 vol % porosity.

In the sealing process 20, a first reactant 18 is applied to the aluminum oxide layer 10, followed by a second reactant 22 such that trivalent chromium is deposited in the porous structure 16 of the aluminum oxide layer 10 to form a physical barrier 30 over the aluminum oxide layer 10.

The sealing process 20, in one embodiment, is initiated by filling the porous structure 16 with the first reactant 18 from an open or exposed surface (step 102). The first reactant 18 includes, for example, chromium (III) sulfates such as $Cr_2(SO_4)_3.XH_2O$, $Cr_2(SO_4)_3.H_2O$, $(Cr_2(H_2O)_6(OH)_4)SO_4$ as non-limiting examples, or chromium (III)nitrates such as $Cr(NO_3)_3.9H_2O$, as non-limiting examples, with a transition metal precursor such as $ZrO(NO_3)_2XH_2O$, $Zr(OC_3H_7)_4$, $K_2ZrF_6$ and $Ti(OC_3H_7)_4$, as non-limiting examples. The chromium (III), i.e., a trivalent chromium, provides corrosion protection in the porous structure 16 of the aluminum oxide layer 10 to facilitate formation of the physical barrier 30. The transition metal facilitates structure growth in the porous structure 16, which supports the physical barrier 30.

Then, the second reactant 22 is applied over the first reactant 18 to generate reaction products (step 104, 106). The second reactant 22 includes a rare earth element precursor containing cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y), or combinations thereof, as a non-limiting examples, and an alkaline earth element precursor containing magnesium (Mg), calcium (Ca), strontium (Sr), and barium (Ba), and combinations thereof, as non-limiting examples. A pH adjustor may also be provided such as $H_2SO_4$, KOH, NaOH, $NH_2CONH_2$, and $NH_4OH$ for the proper pH for the desired reaction.

Reaction between the first reactant 18 and the second reactant 22 form a sealant layer of a crystalline structure that contains trivalent chromium, a transition metal, a rare earth element, and an alkaline earth element. Examples of this crystalline structure include a doped perovskite material, a doped pyrochlore material and combinations thereof. Rare earth element precursors in the second reactant 22 can include, but are not limited to, $LaCl_3.7H_2O$, $La(NO_3)_3.6H_2O$, $Y(NO_3)_3.6H_2O$, and $Ce(NO_3)_3.6H_2O$ as non-limiting examples. Non-limiting examples of the alkaline earth element precursors, can include, $Mg(NO_3)_2.6H_2O$, $CaCl_2.2H_2O$, $Ca(NO_3)_2.4H_2O$, $Sr(NO_3)_2$, $SrCl_2.6H_2O$, and combinations thereof. $Al(NO_3)_3.9H_2O$, and $NH_2CONH_2$ can also be included in the second reactant 22 to provide additional constituents to the crystalline structure of the physical barrier 30 or otherwise direct the reaction.

The reaction products create a physical barrier 30 to the porous structure 16, which is filled with corrosion inhibitors 32 after drying (step 110) and curing (step 112). That is, the aluminum oxide matrix of the porous aluminum oxide skeleton is used as a reactant in the process of forming a perovskite-like or pyrochlore-like material that ultimately results in pore closure. The reaction between the first reactant 18 with the second reactant 22 generates insoluble reaction products that seal the anodized layer 10 as well as store trivalent chromium in the porous structure 16 of the anodized layer 10 to further inhibit corrosion. Thus, the reactants form reservoirs of trivalent chromium in the pore space of the porous structure 16, and a physical barrier over the reservoirs of the trivalent chromium.

In some instances, aluminum from the aluminum oxide layer can form part of the physical barrier 30. For example, aluminum from the aluminum oxide can be inserted in the B position of so-called lanthanum chromite perovskite materials with the general formula $ABO_3$. For instance, $La_{(1-x)}A_xCr_{(1-y)}B_yO_3$ can be synthesized with A=Ca or Sr and B=Al or Mg, with x=0 to 1, preferably 0.05 to 0.8, and more preferably 0.1 to 0.5 and y=0 to 1, preferably 0.05 to 0.8, and more preferably 0.1 to 0.5. Such perovskite-like nanopowders can be synthesized under hydrothermal conditions to close the porous structure 16 of the anodized layer 10 and provide superior corrosion protection. Additionally, other transition metals can also be introduced on the B-site of the perovskite structure. This provides a reactive transformation from a porous to a dense interfacial layer with chemical constituents that react with aluminum oxide under the formation of a stable and dense chemical compound.

One embodiment exposes the anodized layer with the first reactant 18 containing the first active components that are in the porous structure 16 such that the active metal precursor is dissolved in an aqueous or organic solution (step 103) to the second reactant 22.

Figure 2:
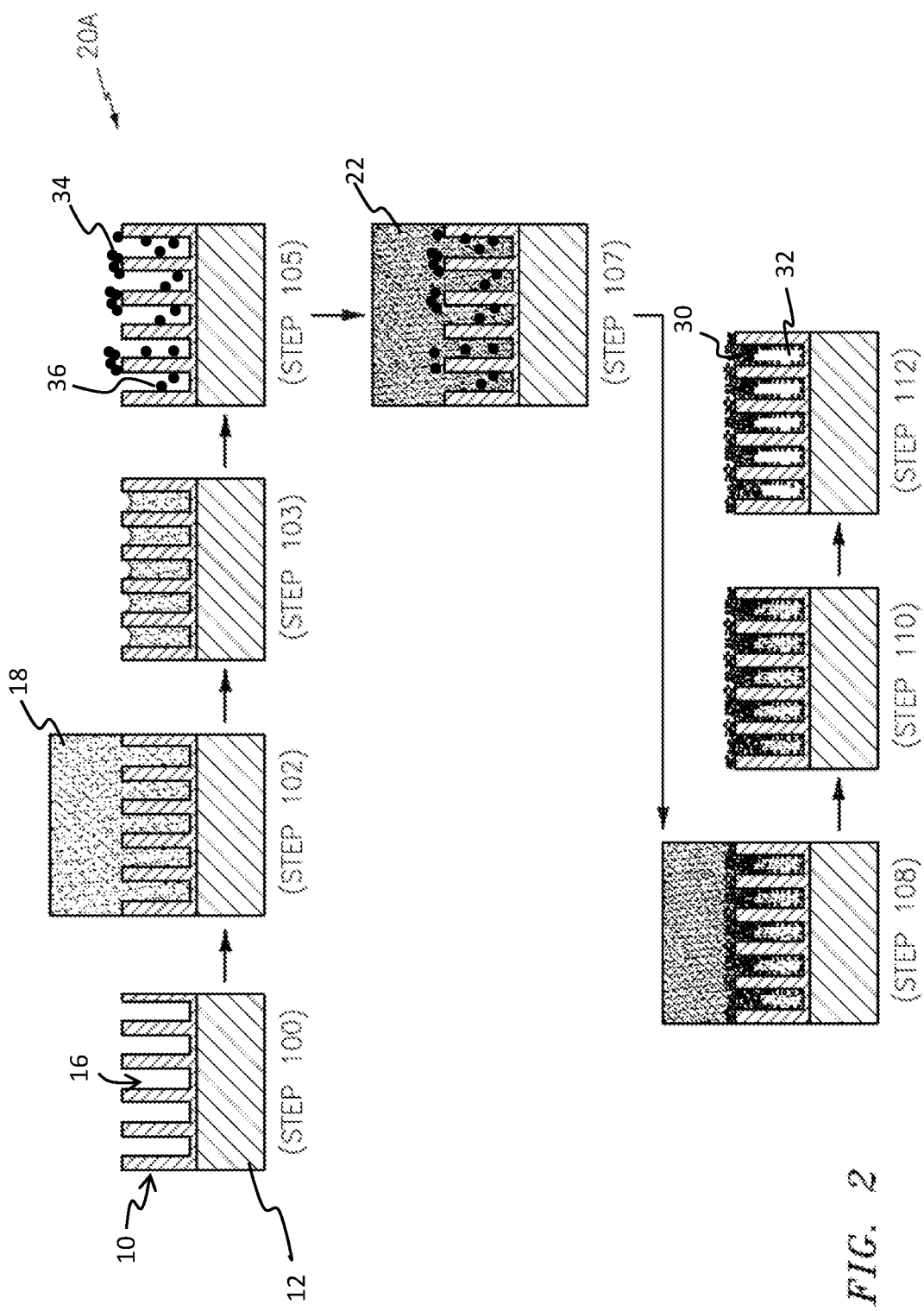
FIG. 2 is a block diagram that illustrates a sealing process of an anodized layer according to another disclosed non-limiting embodiment.

Another embodiment includes drying the anodized layer 10 that has been exposed to the first reactant 18 (process 20A, step 105; FIG. 2). This causes the active components in the first reactant 18 to precipitate inside the porous structure 16 (subflorescence 36) and on top of the porous structure 16 (efflorescence 34). Subflorescence is the precipitation within the porous structure 16 instead of at the surface of the porous structure 16. Efflorescence is the crystallization of salt at a surface of the porous structure 16 due to the evaporation of a solvent from a salt reactant inside the porous structure 16. The precipitation may depend on the drying rate, temperature, pore size, and the nature of the active component. When the active components of the first reactant 18 precipitate inside the porous structure 16 after being subjected to drying (which is detailed below), the average pore diameters are decreased in size. The decrease in pore diameter results in increased capillarity which induces the second reactant to enter the pores more easily.

The drying rate may also be particularly relevant to the physical phenomena of efflorescence. A high drying rate induces a strong advection towards the surface and the evaporation of the solvent causes an increase in salt concentration to the point at which salt nucleation and crystallization occurs. At a slow drying rate, the salt concentration stays homogeneous throughout the sample and slowly rises towards the concentration at which the salt starts to precipitate throughout the layer, as is subflorescence.

The pore size is also relevant as a relatively small pore size will result in a relatively high capillary force but viscous flow can become relatively slow such that diffusion becomes the transport mechanism for reactants to enter the porous structure 16. Other factors include, but are not limited to, the porosity of the substrate, the environment temperature and relative humidity, and the velocity of the airflow in contact with the substrate. The layer with precipitated salt can be porous and hydraulically connected to the wet zone at the bottom via capillary-induced liquid flow supplying the evaporative demand.

It should be appreciated that aluminum alloys with different heat treatments and surface treatments such as shot peening, should typically not be heated above about 225° F. (107° C.) to preserve the mechanical properties. This temperature limit applies only to aluminum alloys that have been shot peened.

High temperature aluminum alloys that are not shot peened can be subjected to operating temperatures that are greater than 107° C., preferably greater than 150° C., and more preferably greater than 200° C.

This may provide an upper limit to the temperature of the hydrothermal process. Anodized aluminum alloy substrates also pose limits on the pH that can be used under hydrothermal conditions, as aluminum oxide is an amphoteric oxide. Specific conditions are selected so that the anodized layer becomes sealed without affecting the aluminum alloy itself. Full crystallization of oxides may not be required when the sealed anodized layer is used for corrosion protection.

In another embodiment, an aqueous media is utilized, in which alumina formed during the anodizing process is amorphous and exposure to water can generate different hydrated species such as boehmite, bayerite, and gibbsite. The hydrated forms of alumina are generally more reactive than the dehydrated forms when exposed to reactants from which compounds can be formed with a low solubility in water.

In another embodiment, the reactants form a compound with the composition $RECrO_3$, where RE is a rare earth element or its $Ca^{2+}$, $Sr^{2+}$ and $Al^{2+}$ doped forms, which may be crystallized into a perovskite crystal structure if heated to elevated temperatures. This sealing process fills the porous structure 16 with a trivalent chromium precursor and possibly a dopant such as $Ca^{2+}$ and/or $Sr^{2+}$ precursors. The filled anodized layer is then subsequently exposed to a reactant that contains the $La^{3+}$ precursor, for example, by applying the second reactant 22 over the first reactant 18. The reactants interdiffuse inside the nano-sized porous structure of the anodized layer 10. The reactants may be heated to form a reaction product inside the porous structure 16 and on top of the anodized layer 10. The hydrated aluminum oxide may participate in the reaction by inserting $Al^{3+}$ into the reaction product, for example, as discussed above.

In another embodiment, the reactants form a compound with the composition $La_2Zr_2O_7$ that crystallizes into a pyrochlore crystal structure under hydrothermal conditions. The compound could also contain $Al^{3+}$ by interacting with the hydrated form of aluminum oxide on the pore walls of the porous structure 16. A combination of nucleation mechanisms, pore-size effects, supersaturation evolution (depending on the reaction condition), and drying conditions will determine the state of the sealed anodized layer.

In still another embodiment, a sol gel process may be utilized as a synthetic approach to manufacture metastable solids at relatively low manufacturing temperatures. The sol-gel processes involve hydrolysis and condensation of molecular or ionic precursors to form an oxide network. Colloidal sol-gel dispersions may alternatively be used to infiltrate the anodized layer. Sol-gel processes are typically limited to certain type of metal oxides such as silica, titanic, zirconia, alumina, ceria, all of which use alkoxide precursors.

Solvo-thermal synthesis is another approach in which a mixture of solid and liquid reagents are heated in a sealed reaction vessel close to, or above, the boiling point of the main solvent. This can result in the crystallization of dense (mixed) metal oxides from the reactants, such as perovskites and pyrochlores. Perovskites may only form when the tolerance factor is close to 1, which is the case for $LaCrO_3$ (0.96).

Hydrothermal synthesis is crystal synthesis, or crystal growth, under relative high temperature and high pressure water conditions to dissolve and recrystallize materials that are relatively insoluble under ordinary conditions. Complex oxide powders, such as, $La_{1-x}Sr_xMnO_3$ and $SrZrO_3$, and films, such as $Ca_{1-x}Sr_xTiO_3$ (where x is between 0 and 1, preferably 0.2 to 0.7, and more preferably 0.3 to 0.6), may also be considered hydrothermal reaction products. Process parameters are the composition of the precursor reactant, heating rate, reaction temperature, vessel pressure, and reaction time. Further, silicates and phosphates can also be used as sealing agents.

In an embodiment, the sealing process can be conducted at room temperature or at temperatures greater than room temperature. In an embodiment, the reaction to produce the sealing of the pores can be conducted at temperatures of 15 to 300° C., preferably 50 to 200° C. and more preferably 75 to 107° C. Supersaturated conditions with respect to the reaction products may form inside the porous structure 16. Nucleation of the insoluble reaction products is likely to occur on active sites on the surface of the porous structure 16 inside the anodized layer.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A sealing process, comprising:
    applying a first reactant to a substrate having a porous structure, the first reactant comprising at least one of a trivalent chromium precursor and a transition metal precursor; wherein the substrate is an anodized aluminum-alloy surface with a barrier oxide film; and
    applying a second reactant to the first reactant in the porous structure, where the second reactant comprises a rare earth element precursor and an alkaline earth element precursor; and
    reacting the first reactant with the second reactant to produce a physical barrier over the substrate; where the physical barrier seals the porous structure to form reservoirs that contain the trivalent chromium precursor.

2. The process as recited in claim 1, wherein the trivalent chromium precursor includes at least one of a chromium (III) nitrate, and a chromium (III) sulfate.

3. The process as recited in claim 1, wherein the transition metal precursor includes a precursor of at least one of zirconium and titanium.

4. The process as recited in claim 1, wherein the rare earth element precursor includes at least one of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y) and the alkaline earth element precursor includes at least one of magnesium (Mg), calcium (Ca), strontium (Sr), and barium (Ba).

5. The process as recited in claim 1, wherein the physical barrier is formed at a surface of the substrate.

6. The process as recited in claim 1, wherein the physical barrier is formed within a pore space of the porous structure.

7. The process as recited in claim 1, wherein the physical barrier includes a compound with the composition $RECrO_3$, where RE is a trivalent rare earth cation that is selected from the group consisting of lanthanum, cerium, praseodymium, neodymium, promethium, samarium, europium, gadolinium, terbium, dysprosium, holmium, erbium, thulium, ytterbium, and lutetium, or its $Ca^{2+}$, $Sr^{2+}$ and $Al^{3+}$ doped forms.

8. The process as recited in claim 7, wherein the physical barrier comprises a doped perovskite or pyrochlore crystalline structure.

9. The process as recited in claim 1, wherein the physical barrier comprises a crystalline structure that comprises chromium, a transition metal element, a rare earth element, and an alkaline earth element.

10. The process as recited in claim 9, further comprising crystallizing the compound into a pyrochlore structure.

11. The process as recited in claim 1, wherein the first reactant and the second reactant forms a compound with the composition $La_2Zr_2O_7$ that crystallizes into a pyrochlore crystal structure.

12. The process as recited in claim 11, wherein the compound contains $Al^{3+}$ by interacting with a hydrated form of aluminum oxide on pore walls of the porous structure.

13. The process as recited in claim 1, further comprising a dopant in the first reactant.

14. The process as recited in claim 13, wherein the dopant includes $Ca^{2+}$ and $Sr^{2+}$ precursors.

15. The process as recited in claim 11, wherein the second reactant includes rare earth element precursor.

16. The process as recited in claim 15, wherein a trivalent rare earth cation of the rare earth element precursor includes at least one of lanthanum, cerium, praseodymium, neodymium, promethium, samarium, europium, gadolinium, terbium, dysprosium, holmium, erbium, thulium, ytterbium, or lutetium, or its $Ca^{2+}$, $Sr^{2+}$ and $Al^{3+}$ doped forms.

* * * * *